(12) United States Patent  
Bishwas

(10) Patent No.: US 11,584,895 B2  
(45) Date of Patent: Feb. 21, 2023

(54) METHOD AND SYSTEM FOR PRODUCING A GAS MIXTURE

(71) Applicant: Hymeth ApS, Søborg (DK)

(72) Inventor: Sumon Bishwas, Copenhagen (DK)

(73) Assignee: Hymeth APS (DK)

( * ) Notice: Subject to any disclaimer, the term of this patent is extended or adjusted under 35 U.S.C. 154(b) by 214 days.

(21) Appl. No.: 16/649,231

(22) PCT Filed: Sep. 19, 2018

(86) PCT No.: PCT/EP2018/075336  
§ 371 (c)(1),  
(2) Date: Mar. 20, 2020

(87) PCT Pub. No.: WO2019/057764  
PCT Pub. Date: Mar. 28, 2019

(65) Prior Publication Data  
US 2020/0255757 A1 Aug. 13, 2020

(30) Foreign Application Priority Data  
Sep. 21, 2017 (EP) .................................... 17192449

(51) Int. Cl.  
*C10L 3/08* (2006.01)  
*C25B 1/04* (2021.01)  
*C25B 15/08* (2006.01)

(52) U.S. Cl.  
CPC .................. *C10L 3/08* (2013.01); *C25B 1/04* (2013.01); *C25B 15/08* (2013.01);  
(Continued)

(58) Field of Classification Search  
CPC .. C10L 3/08; C10L 2290/24; C10L 2290/547; C10L 2290/548; C10L 2290/56; C25B 1/04; C25B 15/08  
See application file for complete search history.

(56) References Cited

U.S. PATENT DOCUMENTS 3,999,089 A  12/1976  Barros  
4,419,329 A * 12/1983  Heller ....................... C01B 3/04  
422/111

(Continued)

FOREIGN PATENT DOCUMENTS

CN   101657525   2/2010  
CN   204026756   12/2014  
(Continued)

OTHER PUBLICATIONS

Office Action for Indian Application No. 202047016248 dated Aug. 31, 2021, 7 pages.

(Continued)

*Primary Examiner* — Cephia D Toomer  
(74) *Attorney, Agent, or Firm* — McAndrews, Held & Malloy, Ltd.

(57) ABSTRACT

A method of producing a gas mixture, said method comprising the steps of: a) subjecting water to electrolysis to obtain a hydrogen gas stream and an oxygen gas stream; b) reacting the hydrogen gas stream with solid carbon to obtain a stream comprising hydrocarbon gas, such as methane gas; and c) mixing the oxygen gas stream with the stream comprising hydrocarbon gas.

11 Claims, 5 Drawing Sheets

(52) U.S. Cl.
CPC ..... *C10L 2290/24* (2013.01); *C10L 2290/547* (2013.01); *C10L 2290/548* (2013.01); *C10L 2290/56* (2013.01)

(56) References Cited

U.S. PATENT DOCUMENTS

| | | |
|---|---|---|
| 5,711,770 A | 1/1998 | Malina |
| 6,521,205 B1 | 2/2003 | Beck |
| 6,977,120 B2 | 12/2005 | Chou et al. |
| 9,631,284 B2 | 4/2017 | Braun et al. |
| 2009/0145771 A1 | 6/2009 | Mishra et al. |
| 2016/0230311 A1 | 8/2016 | Vince |

FOREIGN PATENT DOCUMENTS

| | | | |
|---|---|---|---|
| CN | 104271807 | 1/2015 | |
| CN | 205258620 | 5/2016 | |
| CN | 108408690 * | 8/2018 | |
| KR | 20160049379 | 5/2016 | |
| WO | WO-2005005009 A2 * | 1/2005 | ............ B01J 19/088 |
| WO | 2013190581 | 12/2013 | |
| WO | 2016123226 | 8/2016 | |

OTHER PUBLICATIONS

Office Action for Chinese Application No. 201880070268.9 dated Aug. 16, 2021, 13 pages.

EPO Communication for Application No. 18780038.8 dated Feb. 16, 2021, 4 pages.

Written Opinion of the International Preliminary Examining Authority for International Application No. PCT/EP2018/075336, dated Sep. 9, 2019, 7 pages.

European Search Report for European Patent Application No. 17192449.1, dated Jan. 18, 2018, 10 pages.

Mohseni, et al., "Biogas from renewable electricity—Increasing a climate neutral fuel supply," Applied Energy 90, 2012, 11-16, 6 pages.

Minutillo, et al., "Renewable energy storage system via coal hydrogasification with co-production of electricity and synthetic natural gas," International Journal of Hydrogen Energy 39 (2014), pp. 5793-5803.

HHO Heating System BV, "New unique Central System uses only water for Fuel," http://www.hho-heatingsystem.com/, Jun. 16, 2017, pp. 1-2.

Tosti, et al., "EU scenarios of renewable coal hydro-gasification for SNG production," Sustainable Energy Technologies and Assessments 16 (2016), pp. 43-52.

International Search Report and Written Opinion corresponding to International Patent Application No. PCT/EP2018/075336, dated Feb. 22, 2019.

* cited by examiner

METHOD AND SYSTEM FOR PRODUCING A GAS MIXTURE

CROSS-REFERENCE TO RELATED APPLICATIONS/INCORPORATION BY REFERENCE

The present application is the U.S. national phase under § 371 of International Application No. PCT/EP2018/075336, having an international filing date of Sep. 19, 2018, which claims priority to EP Patent Application No. 17192449.1, filed Sep. 21, 2017. Each of the above-mentioned prior-filed applications is hereby expressly incorporated herein by reference in its entirety.

TECHNICAL FIELD

The present disclosure relates to a method and system for producing a gas mixture.

BACKGROUND

On for example the subcontinent, old-fashioned stoves used in cooking often burn a mix of wood, hay, or cow dung. This fuel has typically been collected by the women of the household. During collecting, the women may need to move away from the safety provided by their homes. Moreover, the smoke from the fire produced by the stoves has proved to increase the risk of certain diseases such as pneumonia, chronic respiratory disease and heart disease.

SUMMARY

In view of the above, a general object of the present disclosure is to solve or at least reduce the problems of the prior art.

There is hence according to a first aspect of the present disclosure provided a method of producing a gas mixture, said method comprising the steps of: a) subjecting water to electrolysis to obtain a hydrogen gas stream and an oxygen gas stream; b) reacting the hydrogen gas stream with carbon to obtain a stream comprising hydrocarbon gas, such as methane gas; and c) mixing the oxygen gas stream with the stream comprising hydrocarbon gas.

The newly formed hydrogen gas from the electrolysis is very reactive since the electrons of the newly formed hydrogen molecules are still slightly in motion, making step b) more efficient. By means of the hydrogen and oxygen gas streams obtained from the electrolysis, a continuous process from water to the stream comprising hydrocarbon gas may be provided. The process does hence not require any stored gas volumes but only relies on the hydrogen and oxygen gas streams obtained from the electrolysis process.

Thus, synthetic natural gas for example for cooking may be provided with water as fuel basis in a continuous process.

The water is preferably alkaline water. The electrolysis may thus be alkaline water electrolysis.

The carbon may be solid carbon. By means of using solid carbon, preferably amorphous carbon, the reaction with hydrogen gas occurs without any external energy input.

In electrolysis, initially hydrogen forms as atomic hydrogen, having symbol H. Atomic hydrogen is very unstable since it only has one electron. Therefore, it bonds with another H atom soon after forming. However, since the H2 molecular bond is new, the electrons are still vibrating and the H2 molecules are not completely stable. By streaming these fresh H2 molecules through solid carbon, they react with the solid carbon and convert into a hydrocarbon. Amorphous carbon, such as coal is reactive compared to graphite or other forms of carbon, and is especially beneficial for the present process.

One embodiment further comprises the step of subjecting water to a purification process to obtain purified water that is used in step a), optionally after an electrolyte has been dissolved in it.

Typically, purified water has too low electric conductivity to enable efficient electrolysis. Therefore, preferably, an electrolyte is dissolved in the purified water before step a). The electrolyte may for example be potassium hydroxide (KOH). The electrolyte concentration in the water may for example be 1 Molar. Thus, the KOH concentration in the water may for example be 1 Molar.

The carbon may be reactive carbon.

According to one embodiment the purification process comprises purification with activated carbon. Larger particles may thereby be removed from the water.

According to one embodiment the purification process comprises reverse osmosis. Any commercially available membrane may for example be used for this purpose.

According to one embodiment the purification process comprises deionization. A mixed bed deionization resin may for example be used for the deionization. In a mixed bed deionization device, cation and anion resins may be combined and mixed in a single tank. It is also possible to add activated carbon with the cation and anion resins in a mixed bed deionization resin tank.

According to one embodiment the purification process comprises, in sequence, purification with activated carbon, reverse osmosis and deionization.

According to one embodiment the carbon of step b) comprises or consists of amorphous carbon. The amorphous carbon may for example comprise powder or flakes of amorphous carbon. Reactive carbon, i.e. amorphous carbon, can for example be achieved by applying high temperature to decompose sugar into the purest form of amorphous carbon under normal atmospheric conditions.

According to one embodiment the solid carbon is provided as a coating on an inner surface of a reactor.

One embodiment comprises the step of burning the gas mixture obtained in step c) in a gas burner. The gas burner may for example be a gas burner in a stove, a grill, an oven, such as a pizza oven, or in a welding tool.

There is according to a second aspect of the present disclosure provided a system for producing a gas mixture, comprising: an electrolysis device for electrolysis of water to hydrogen gas and oxygen gas; a reactor for reacting hydrogen gas from the electrolysis device to hydrocarbon gas, such as methane gas; and a mixing device for mixing hydrocarbon gas from the reactor with oxygen gas from the electrolysis device.

The mixing device may for example be a Tee-connector/T-connector. The Tee-connector is configured to merge the hydrocarbon gas stream with the oxygen gas stream from the electrolysis device.

According to one embodiment, the system may comprise a one-way valve connected to the reactor outlet, wherein the mixing device, for example a Tee-connector, is configured to be connected to the one-way valve. In particular the one-way valve may be connected between the mixing device and the reactor outlet.

According to one embodiment the electrolysis device comprises a hydrogen gas outlet and an oxygen gas outlet; the reactor comprises a reactor inlet and a reactor outlet; and the mixing device comprises a first mixing inlet, a second mixing inlet and a gas mixture outlet, and wherein the rector inlet is connected to the hydrogen gas outlet, the first mixing inlet of the mixing device is connected to the reactor outlet, and the second mixing inlet is connected to the oxygen gas outlet.

The reactor may for example be a pipe filled with carbon. The carbon is preferably reactive carbon.

One embodiment further comprises a water purification arrangement for providing purified water forming basis for the water used in the electrolysis device.

According to one embodiment the water purification arrangement comprises a filter of activated carbon.

According to one embodiment the water purification arrangement comprises a reverse osmosis device.

According to one embodiment the water purification arrangement comprises a deionization device.

According to one embodiment the purification arrangement comprises, in series, a filter of activated carbon, a reverse osmosis device and a deionization device.

According to one embodiment the reactor comprises carbon, preferably amorphous carbon.

According to one embodiment the reactor has an inner surface provided with a coating of the solid carbon. The reactor may for example be tubular and the inner surface of the tubular reactor may be coated with amorphous carbon. The amorphous carbon may for example be provided in the form of sand and/or as flakes on the inner surface of the reactor.

The reactor has a reactor inlet and a reactor outlet. The reactor may preferably be arranged vertically such that the reactor inlet is arranged at the top and the rector outlet is arranged at the bottom. Since hydrogen gas is lighter than air, first the hydrogen gas enters from the top and fills the reactor. When a pressure has been built up, the gas mixture comes out through the reactor outlet. This configuration prevents the hydrogen gas from quickly escaping the reactor without reacting much with the solid carbon inside due to the low density.

The reactor may be a straight tubular pipe or it may have other shapes such as a spiral shape or an undulating tubular shape. The flow resistance may thus be increased and the reaction may be maximised. In particular it increases the ratio of H2:CH4 in the gas stream produced.

One embodiment further comprises a flashback arrestor arranged downstream the mixing device. Reverse gas flow may thus be prevented and the flame obtained from igniting the gas mixture may be extinguished.

According to one embodiment the electrolysis device comprises a plurality of electrolytic cells.

According to one embodiment at least two electrolytic cells can be switched on and off independently of each other.

According to one embodiment a first power switch is connected to a first electrolytic cell and a second power switch is connected to a second electrolytic cell.

According to one embodiment at least one pressure sensor is arranged downstream the electrolysis device and the first and/or the second power switch is/are connected to the at least one pressure sensor.

According to one embodiment at least one pressure sensor is arranged to measure the pressure in the reactor, in a gas flow to the reactor or in a gas flow from the reactor.

According to one embodiment at least one pressure sensor is arranged to measure the pressure of the gas mixture in or from the mixing device.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

Examples of the inventive concept will now be described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
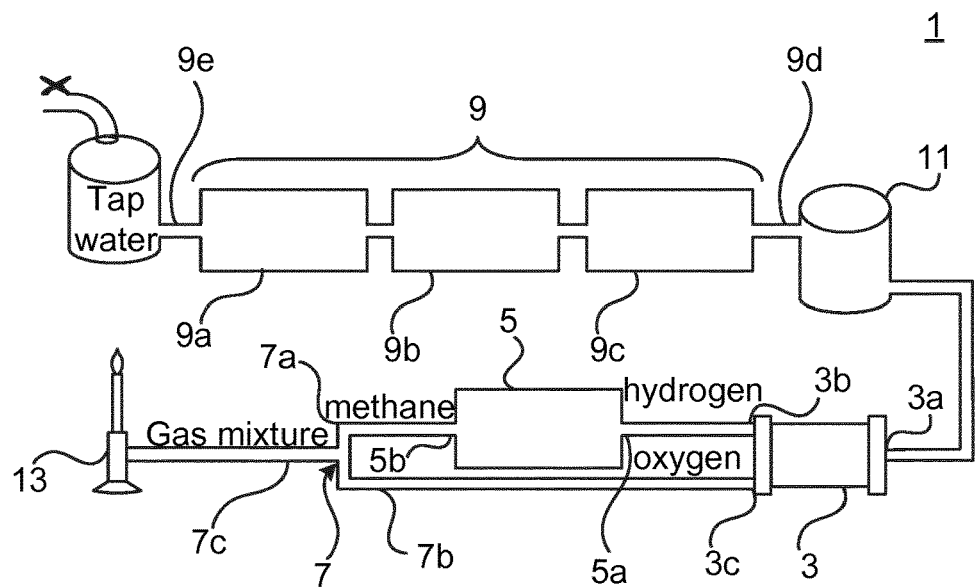
FIG. 1 schematically shows an example of a system for producing a gas mixture.

FIG. 1 shows an example of a system for producing a gas mixture. System 1 comprises an electrolysis device 3, a reactor 5, and a mixing device 7.

The electrolysis device 3 is configured to perform electrolysis of water, such as alkaline water to produce hydrogen gas and oxygen gas. The electrolysis device 3 has a water inlet 3a for receiving water, such as alkaline water. The electrolysis device 3 has a hydrogen gas outlet 3b for discharging a hydrogen gas stream formed in the electrolysis device 3. The electrolysis device 3 has an oxygen gas outlet 3c for discharging an oxygen gas stream formed in the electrolysis device 3.

The reactor 5 for reacting hydrogen gas obtained from the hydrogen gas outlet 3b of the electrolysis device 3 to obtain a hydrocarbon gas such as methane. The reactor 5 includes carbon in particular solid carbon, such as amorphous carbon, for reacting the hydrogen gas to obtain the hydrocarbon gas. The reactor 5 has a reactor inlet 5a and a reactor outlet 5b. The reactor inlet 5a is configured to be connected to the hydrogen gas outlet 3b of the electrolysis device 3. The reactor outlet 5b is configured to discharge the hydrocarbon gas formed in the reactor 5. The solid carbon may be provided on the inner surface(s) of the reactor 5, between the reactor inlet 5a and the reactor outlet 5b. Hydrogen gas will thereby be able to react with the solid carbon deposited onto the inner surface(s) of the reactor 5 as it flows through the reactor 5.

The reactor 5 may for example be a pipe provided with carbon such as amorphous carbon inside. Thus, one end of the pipe may be provided with the reactor inlet 5a and the other end of the pipe may be provided with the reactor outlet 5b.

The mixing device 7 is configured to mix the hydrocarbon gas discharged from the reactor 5 with oxygen gas from the oxygen gas outlet 3c of the electrolysis device 3. Hereto, the mixing device 7 comprises a first mixing inlet 7a of a methane gas pipe, a second mixing inlet 7b of an oxygen gas pipe, and a gas mixture outlet 7c where the first mixing inlet 7a and the second mixing inlet 7b are connected. The first mixing inlet 7a is connected to the reactor outlet 5b via the methane gas pipe and the second mixing inlet 7b is connected to the oxygen gas outlet 3c of the electrolysis device 3 via the oxygen gas pipe. The gas mixture outlet 7c may preferably be arranged in a burner tip of a burner 13. To this end, the oxygen gas and the hydrogen gas/methane gas stream from the reactor 5 will then be mixed during the exit from the first mixing inlet 7a and the second mixing inlet 7b in the burner tip for ignition.

The mixing device 7 may for example comprise a Tee-connector/T-connector to merge the hydrocarbon gas flow with the oxygen gas flow from the electrolysis device 3.

The gas mixture outlet 7c may for example be connected to the burner 13 to allow ignition and combustion of the gas mixture discharged from the gas mixture outlet 7c.

As an alternative to mixing the hydrocarbon gas with the oxygen gas stream, the hydrocarbon gas can be mixed with air in or upstream a burner, while the oxygen gas stream is used for another purpose or simply released to the ambient air.

The exemplified system 1 comprises a water purification arrangement 9 and a water reservoir 11. The electrolysis device 3 is fed with water from the water reservoir 11 but could alternatively be fed directly from the water purification arrangement 9, especially if the purified water is mixed with an electrolyte in the electrolysis device 3 to obtain water such as alkaline water.

The water purification arrangement 9 comprises a filter of activated carbon 9a, a reverse osmosis device 9b and a deionization device 9c. These three components are connected in series, with the filter of activated carbon 9a arranged first in the purification process, the reverse osmosis device 9b arranged second and the deionization device 9c third.

The deionization device 9c has an outlet 9d connected to the water reservoir 11, but could alternatively be connected directly to the water inlet 3a of the electrolysis device 3 as previously noted. The water purification arrangement 9 has an inlet 9e connected to the filter of activated carbon 9a, configured to receive non-treated water, such as tap water, to be purified. A more even stream of purified water to the electrolysis device 3 may be obtained by using the buffer capability provided by the water reservoir 11. Typically, an electrolyte is added to the purified water in the water reservoir 11 to obtain alkaline water. Water which includes the electrolyte dissolved therein, e.g. alkaline water, is then provided to the electrolysis device 3.

The electrolysis device 3 may comprise a plurality of electrolytic cells as will be described in more detail in what follows. Each electrolytic cell is provided with two electrodes configured to be connected to terminals of opposite polarity of a power supply. The system 1 may also comprise electronics and/or mechanical components to independently and individually control the power provision to at least some of the electrolytic cells or groups of electrolytic cells, for example all of the electrolytic cells. The system may thus comprise a plurality of power switches for selectively setting a respective one of these electrolytic cells or electrolytic cell groups in an ON state or an OFF state. The number of electrolytic cells that are turned on influences the electrolysis process and in particular the amount of hydrogen gas and oxygen gas generated in the electrolysis process. The hydrogen gas stream and the oxygen gas stream can thus be controlled by selectively controlling the operation of the electrolytic cells.

According to one example the system 1 may comprise one or more pressure sensors (not shown) configured to be arranged downstream of the electrolysis device 3. The pressure sensor(s) may for example be a simple mechanical pressure sensor. The pressure sensors are configured to be connected to the electronics and/or mechanical components which controls the power switches such that a predetermined pressure change or pressure changes detected by the pressure sensor(s) causes the electronics and/or mechanical system to control the state of the power switch(es).

The pressure sensor(s) can for example be arranged to measure the pressure in the reactor 5, in a gas flow to the reactor or in a gas flow from the reactor 5. Since more hydrogen gas is generated than oxygen gas, it may be beneficial to measure the pressure of the hydrogen gas. Alternatively, the pressure sensor(s) may be arranged to measure the pressure of the gas mixture in or from the mixing device 7. In one example the system may comprise a buffering cylinder arranged downstream of the reactor e.g. in the methane gas pipe. This may make the system as well as its production and supply of gasses to the burner more controllable and smooth. In one example, the pressure sensor may be attached to the buffering cylinder for controlling the electrolyser in the buffering cylinder, instead of in the reactor. The pressure sensors may be configured to control some electrolytic cells of the electrolyser to selectively turn on and off predetermined cells or turn on and off the entire electrolyser unit to balance the pressure difference due to constant gas production and dynamic usages/consumption of gases while cooking.

Consequently, the operation of at least one of the electrolytic cells can be controlled in response to one or more pressure(s) changes detected downstream the electrolysis device 3. The system 1 can thus be designed to automatically prevent that an undesired pressure builds up downstream the electrolysis device 3. For example, if a burner being fed the gas mixture is shut off, the pressure will go up and eventually at least one of and preferably all the electrolytic cells will be switched off.

According to one example, for instance three pressure sensors may be installed in the reactor 5. A first pressure sensor of the three pressure sensors is in this example configured to respond to about a 3.45 kPa (0.5 PSI) pressure increase. This response or detection by the first pressure sensor causes the electronics and/or mechanical components to shut down one power switch in the power supply which is powering an electrolytic cell or a group of electrolytic cells. The second pressure sensor is configured to respond to about a 6.89 kPa (1 PSI) pressure increase, if the pressure is still rising due to lower consumption of the produced gas, and the electronics and/or mechanical components switch off the next power switch that is powering other another electrolytic cell or cells. The third pressure sensor is configured to respond to about a 10.34 kPa (1.5 PSI) pressure increase if pressure is still increasing due to any malfunction in the first or second pressure sensor, and the electronics and/or mechanical components shut off the entire electrolysis device 3. The third pressure sensor is in this example used for redundancy. The pressure sensors could be configured to be automatically reactivated, causing the electronics and/or mechanical components to turn power switches back on the specific power supply output to power the specific electrolytic cell or group of electrolytic cells once pressure goes down below 3.45, 6.89 and 10.34 kPa, respectively.

An example of the electrolysis device 3 will now be described in more detail. The electrolysis device 3 comprises a plurality of electrodes, which in pairs form electrolytic cells. FIG. 1 shows an example of an electrode 15 for use in the electrolysis device 3. The electrode 15 comprises an electrically conducting frame 17. The electrically conducting frame 17 may for example comprise copper.

In the present example, the electrically conducting frame 17 comprises two frame members 17a and 17b. The two frame members 17a and 17b are configured to be aligned with each other and mounted together to form the electrically conducting frame 17. It is to be noted that the electrically conducting frame 17 could alternatively consist of a single frame member.

The electrode 15 is configured to be connected to a terminal of a power supply. The exemplified electrode 15 comprises a connection portion 17c configured to be connected to a power supply. In particular, the electrically conducting frame 17 comprises the connection portion 17c. The connection portion 17c may for example be a protrusion or tongue extending from the main body of the electrically conducting frame 17, as shown in FIG. 2.

The electrode 15 further comprises a metal coil 19 and a metal wire 21. The metal coil 19 may for example comprise copper. The metal wire 21 may for example comprise copper. The metal wire 21 extends inside the metal coil 19. The metal coil 19 has a plurality of turns forming an elongated coil body. The metal coil 19 extends between two opposite sides of the electrically conducting frame 17. The metal wire 21 extends inside the elongated coil body, in particular in a central channel formed by the turns of the coil, in the axial direction of the metal coil 19.

Figure 2:
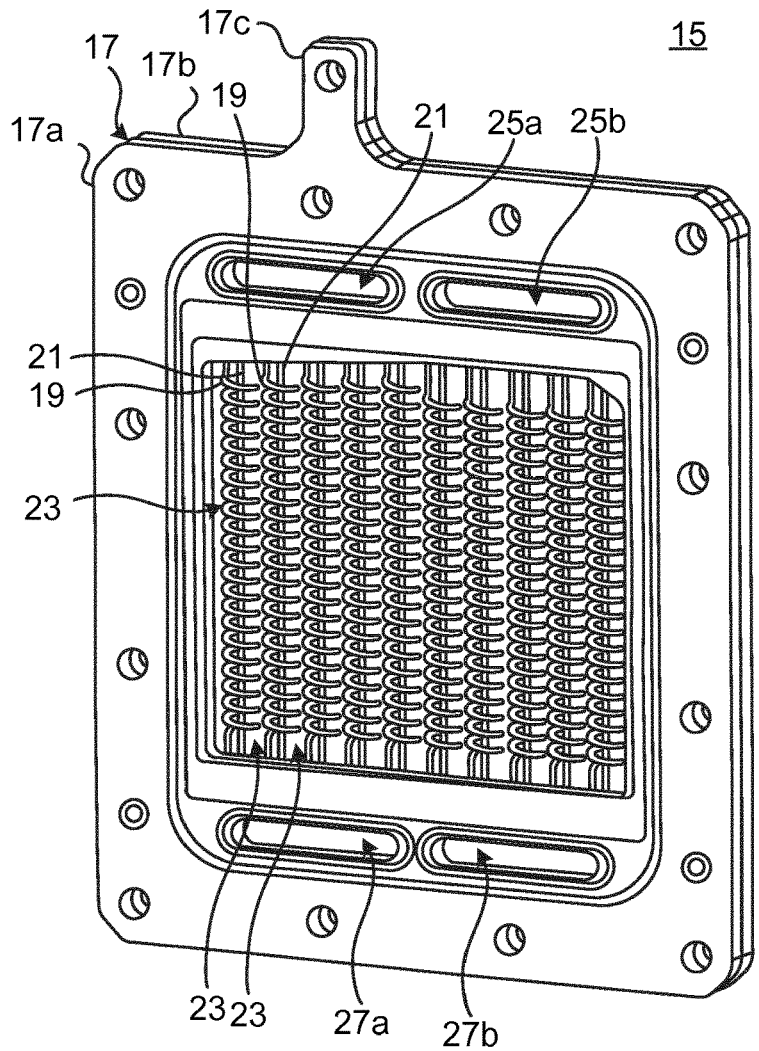
FIG. 2 schematically shows perspective view of an example of an electrode of an electrolysis device.

In the example shown in FIG. 2, the metal wire 21 has a straight or essentially straight longitudinal extension. The metal wire 21 extends from one side of the electrically conducting frame 17 to an opposite side of the electrically conducting frame 17.

The metal coil 19 and the metal wire 21 may be covered with a nanoporous structure comprising nickel.

The exemplified electrode 15 comprises a plurality of pairs of metal coils 19 and metal wires 21. Each pair of metal coil 19 and metal wire 21 will in the following be referred to as a subunit 23. These subunits 23 are arranged inside the electrically conducting frame 17 one after the other. The subunits 23 have a longitudinal extension in a common plane. The subunits 23 are arranged in parallel. The pairs of metal coils 19 and metal wires 21 are hence arranged parallel with each other, extending between opposing sides of the electrically conducting frame 17. The subunits 23 may essentially fill the space between the side portions of the frame. Each subunit 23 may hence extend longitudinally from a first side of the electrically conducting frame 17 to an opposite second side of the electrically conducting frame 17, and the plurality of subunits 23 may be arranged one after the other, in parallel, so that they occupy the space from a third side of the electrically conducting frame 17 to a fourth side of the electrically conducting frame 17, opposite to the third side.

In the present example, the subunits 23 are fixed to the electrically conducting frame 17 between the two frame members 17a and 17b. In particular, each pair of metal coil 19 and metal wire 21 may be clamped between the two frame members 17a and 17b. Other means for attachment of the subunits to the electrically conducting frame are also envisaged. The metal coils and metal wires could for example be attached to the electrically conducting frame by means of screws or other fastening means.

The electrically conducting frame 17 comprises first through-openings 25a-b and at least one second through-opening, in the present example two second through-openings 27a-b, extending through the electrically conducting frame 17 in a direction perpendicular to the longitudinal extension of the subunits 23, i.e. of the metal coils 19 and the metal wires 21. The first through-openings 25a-b are in fluid communication with the subunits 23 at one end of the subunits 23. The second through-openings 27a-b are in fluid communication with the subunits 23 at an opposite end of the subunits 23. The first through-openings 25a-b may for example be gas outlets such as a first gas outlet 25a and a second gas outlet 25b. The second through-opening(s) 27a-b may for example be liquid inlets to allow liquid to submerge the subunits 23. Gas created in the vicinity of the subunits 23 in an electrolysis process due to liquid contact with the subunits 23 provided with an electric potential may exit the electrically conducting frame 17 via the through-openings 25a-b, as will be explained in more detail in what follow.

Figure 3:
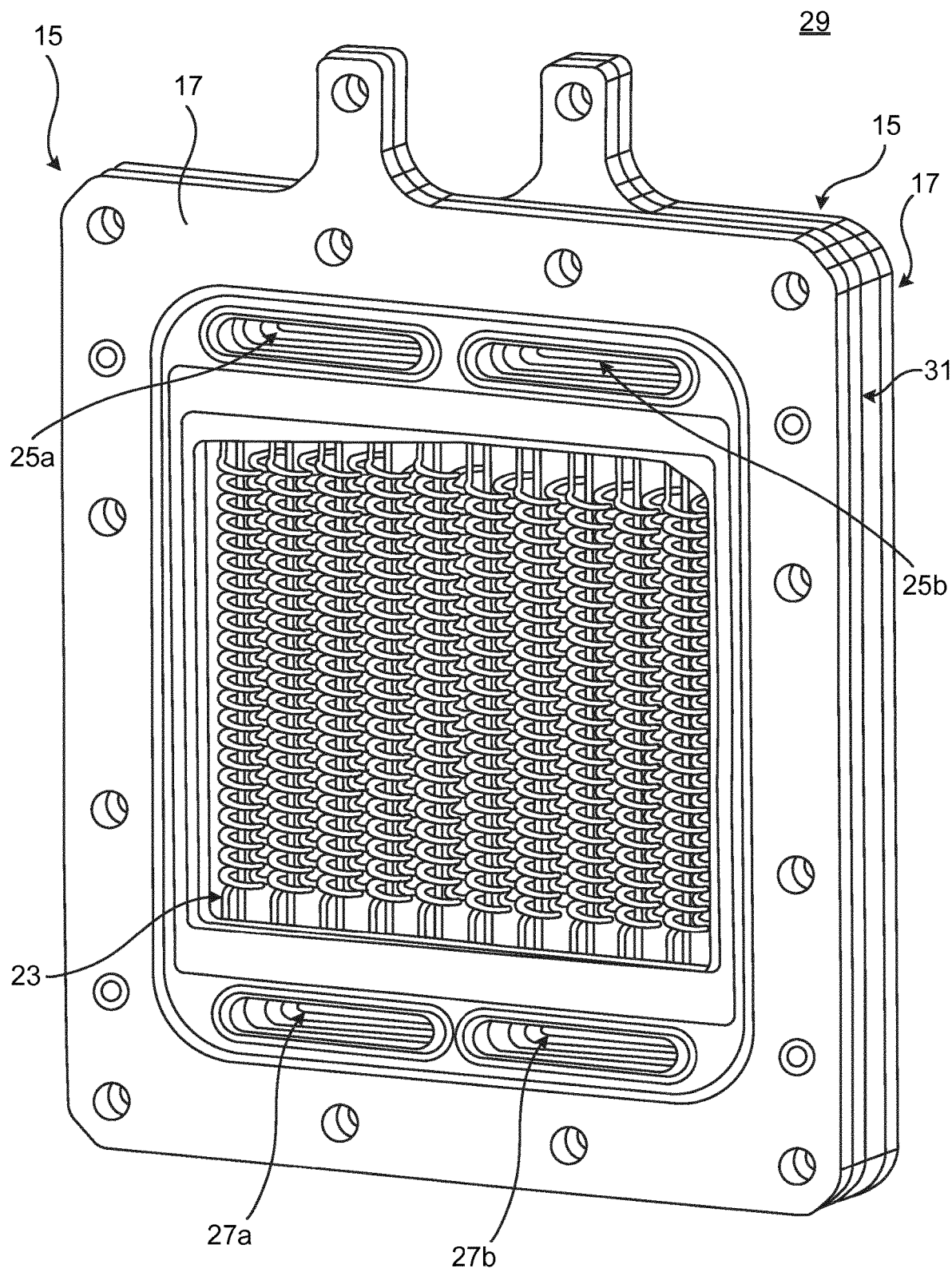
FIG. 3 schematically shows a perspective view of an example of an electrolytic cell.

FIG. 3 shows an example of an electrolytic cell 29. The exemplified electrolytic cell 29 comprises two electrodes 15 arranged in a stacked manner. The first through-openings 25a-b of a first of the electrodes 15 are aligned with the corresponding first through-openings of a second of the electrodes 15 of the electrolytic cell 29.

Figure 4:
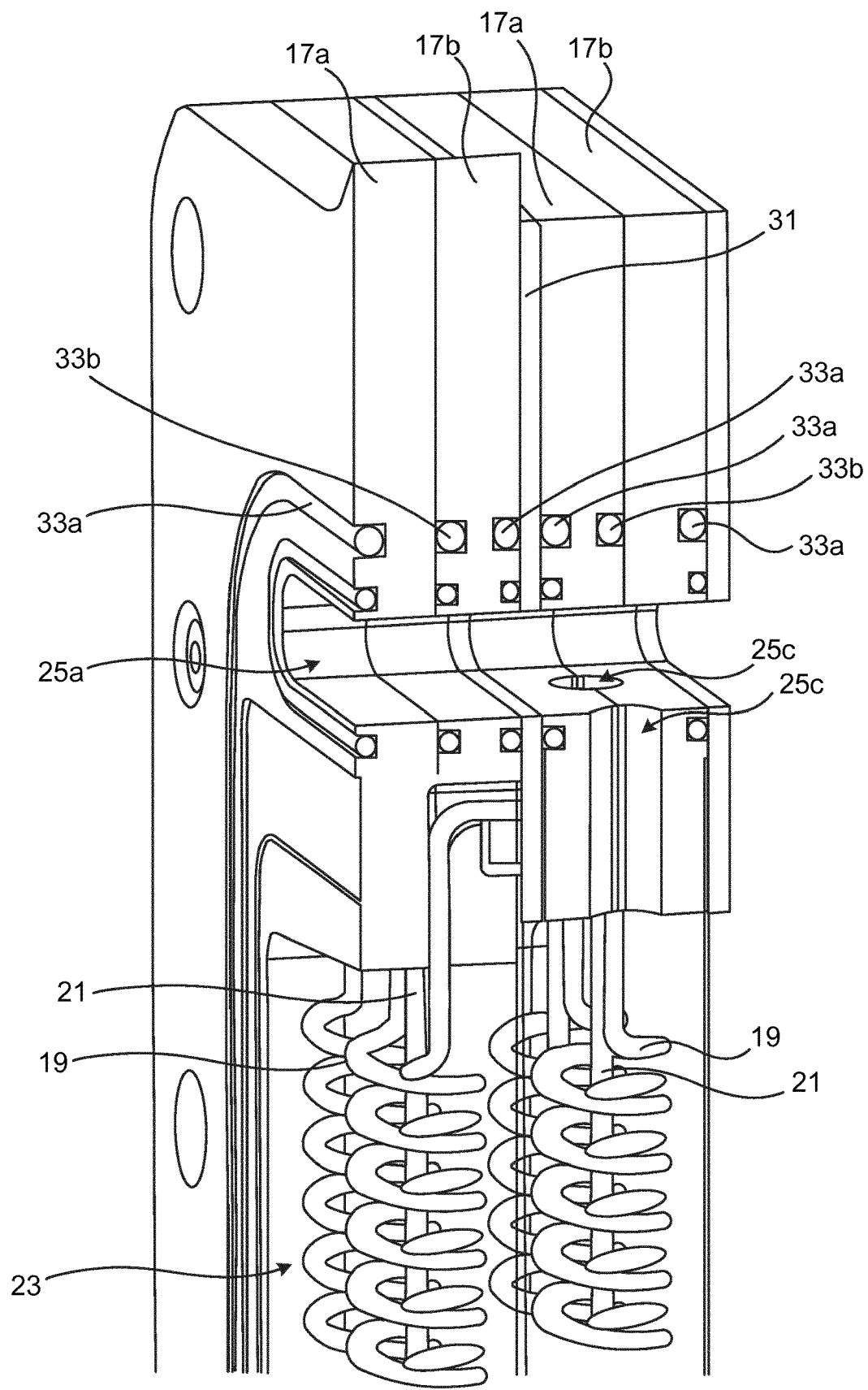
FIG. 4 schematically shows a section through the electrolytic cell shown in FIG. 3.

The second through-openings 27a-b of the first electrode 15 are aligned with the corresponding second through-openings of the second electrode 15 of the electrolytic cell 29. Liquid is thus able to flow through the electrically conducting frames 17 to the subunits 23. Moreover, gas is able to flow from the subunits 23 and through the stacked electrically conducting frames 17 via the first through-openings 25a-b. This configuration is illustrated for the first through-openings 25a of the two electrodes 15 in FIG. 4, which is a section of a top portion of the electrolytic cell 29 shown in FIG. 3.

The electrolytic cell 29 may comprise a membrane (not shown), such as a separator membrane. The membrane is arranged between the two electrodes 15. In particular, the membrane may be sandwiched between the two electrodes 15.

The electrolytic cell 29 may comprise at least one gasket 31 sandwiched between two adjacent electrodes 15. An elastomer, such as a polymeric elastomer, is typically used for the at least one gasket 31. The gasket material may be electrically insulating. In such case, the gasket 31 is configured to electrically insulate the two adjacent electrodes 15 from each other.

A membrane and one or more gasket(s) 31 may thus jointly separate two adjacent electrodes of an electrolytic cell 29. A membrane and one or more gasket(s) 31 may also jointly separate two adjacent electrolytic cells 29.

The electrolytic cell 29 may also comprise one or more first sealing members 33a such as O-rings to ensure a fluid tight connection between the two electrodes 15. The electrolytic cell 29 may also comprise second sealing members 33b configured to provide a fluid-tight connection between the frame members 17a and 17b of each electrode 15. The second sealing members 33b may for example be O-rings.

It has previously been stated that the first through-openings 25a-b of each electrode 15 are in fluid communication with one end of the corresponding subunits 23. In the example in FIG. 4, an example of this fluid communication is provided. In particular, the electrically conducting frame 17 comprises fluid channels 25c extending from only one of the first through-openings 25a-b to the subunits 23. In particular, only one of the electrodes 15 has fluid-channels 25c connected to the first through-opening 25a and only one of the electrodes 15 has fluid channels connected to the first through-opening 11b. This ensures that the two gas flows can be separated from each other, as will be explained below.

The electrically conducting frame 17 may also comprise fluid channels (not shown) for connecting the second through-openings 27a-b with the other end of the subunits 23.

Figure 5:
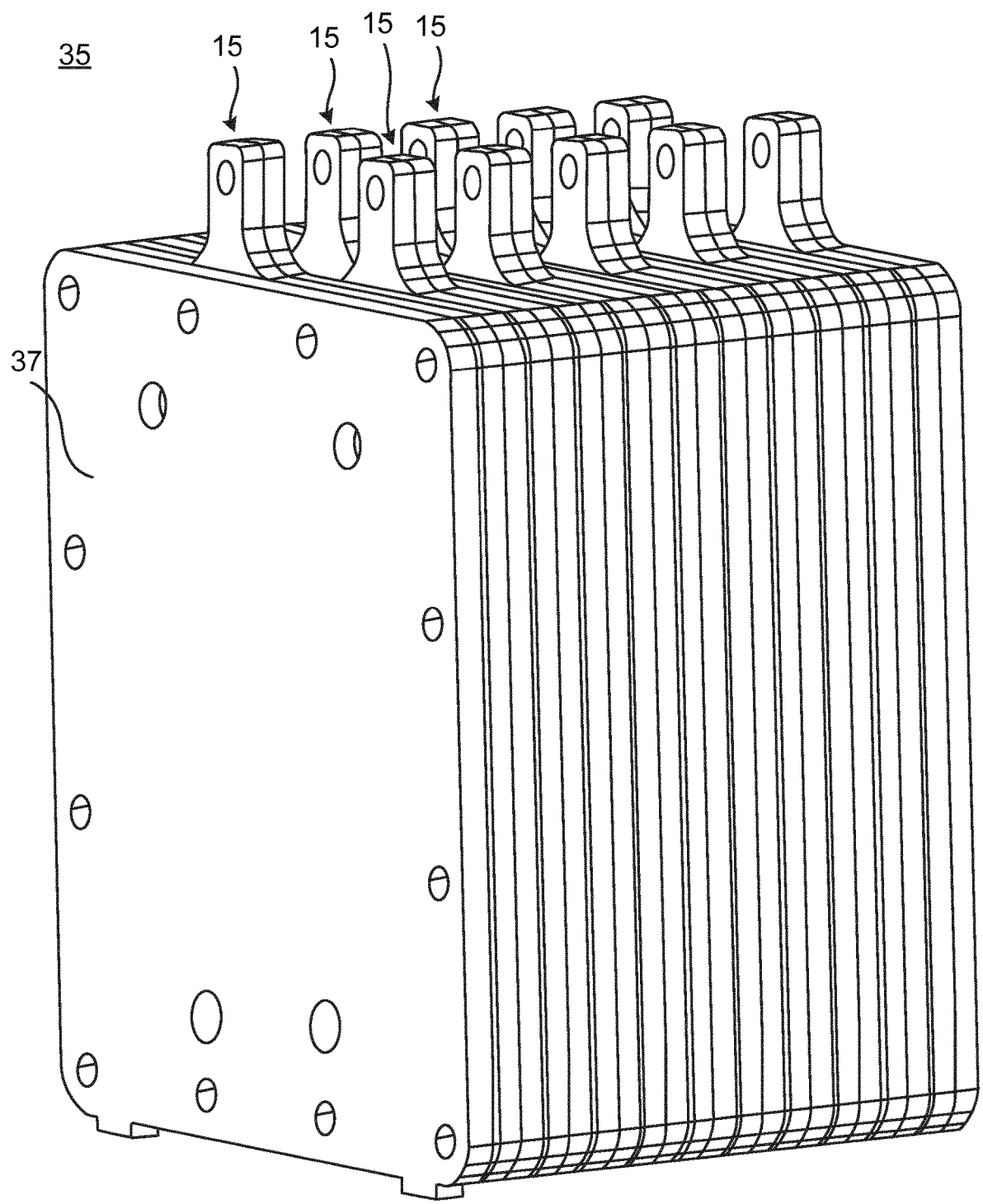
FIG. 5 schematically shows an example of an electrolyser stack comprising a plurality of electrolytic cells shown in FIG. 3.

FIG. 5 shows an electrolyser stack 35. The electrolyser stack 35 comprises a plurality of electrodes 15 arranged one after the other in a stacked manner. In particular, the electrolyser stack 35 comprises a plurality of electrolytic cells 29. Between each pair of adjacent electrodes 15, there is provided at least one gasket 31 and a membrane.

The exemplified electrolyser stack 35 includes a first end plate 37 configured to be mounted to a first outermost electrode 15 and a second end plate (not shown) configured to be mounted to a second outermost electrode 15, at an opposite end of the electrolyser stack 35. The electrolyser stack 35 together with a power supply may form the electrolysis device 3.

Figure 6:
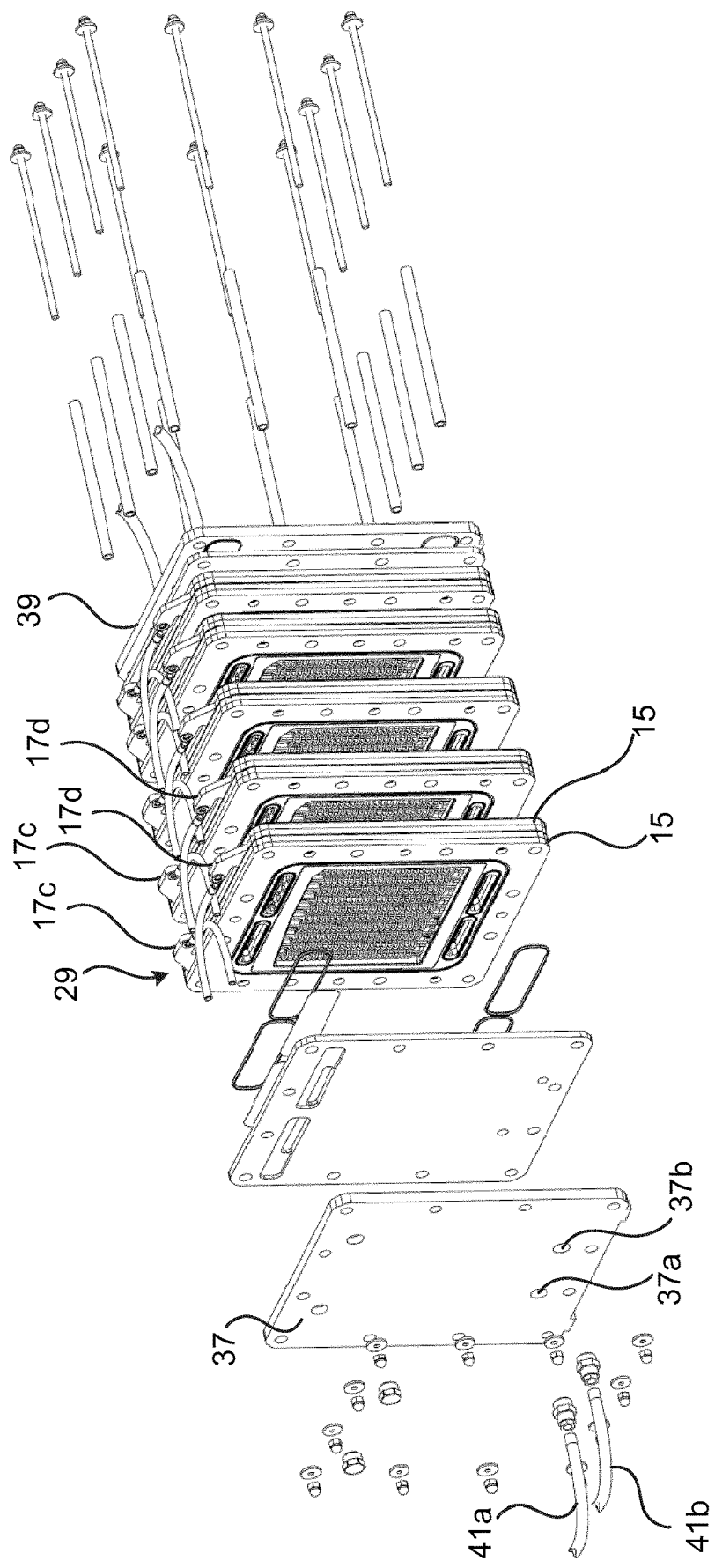
FIG. 6 is an exploded view of an electrolyser stack.

The operation of the electrolyser stack 35 will now be described with reference to FIG. 6, which shows an exploded view of the electrolyser stack 35. In the exploded view, some additional components are also shown. Here, for example, the second end plate 39 is shown. The electrodes 1 are arranged one after the other, forming electrolytic cells 29 in adjacent pairs. Each electrolytic cell 29 has a first connection portion 17c and a second connection portion 17d. Each first connection portion 17c is in electrical connection with a respective electrically conducting frame 17. Each second connection portion 17d is in electrical connection with a respective electrically conducting frame 17. All of the first connection portions 17c are in use connected to a first terminal of a power supply. All of the second connection portions 17d are in use connected to a second terminal of a power supply. Thus the electrodes 15 provided with a first connection portion 17c will in use have a first electric potential and the electrodes provided with a second connection portion 17d will have a second electric potential.

The electrolyser stack 35 is configured to be connected to a liquid supply, typically a water supply such as the water reservoir 11. Hereto, the first end plate 37 is provided with fluid inlets 37a and 37b configured to be connected to a liquid supply. The fluid inlets 37a and 37b are connected to a respective one of the second through-openings 27a and 27b. In the example shown in FIGS. 6, pipes 41a and 41b can be connected to a respective fluid inlet 37a and 37b.

The second end plate 39 is provided with fluid outlets (now shown). The fluid outlets are configured to be connected to e.g. pipes. A first fluid outlet is configured to be connected to one of the first through-openings 25a and 25b and a second fluid outlet is configured to be connected to the other of the first through-openings 25a and 25b. Thus, in the present example the first fluid outlet is configured to be connected to the first through-opening 25a and the second fluid outlet is configured to be connected to the first through-opening 25b. When the electrolyser stack 35 has been installed, the second through-openings 25a-b are located closer to the bottom of the electrolyser stack 35 than the first through-openings 25a-b. When for example water such as alkaline water enters the electrolyser stack 35 through the first inlet 41a and the second inlet 41b, the water will flow through the second through-openings 27a and 27b. As more water flows into the electrolyser stack 35, water is distributed and flows upwards into the fluid channels of the electrically conducting frames 17. From here, the water flows into a fluid chamber, which is formed by the stacked electrolytic cells 29. The fluid chamber is subsequently filled with water which contacts the subunits 9, i.e. the metal coils 19 and the metal wires 21. When the electrodes 15 are fed with current, an electrolysis process is initiated. Thus, hydrogen gas is created at the cathodes and oxygen at the anodes. The hydrogen gas and the oxygen gas, which rise due to lower density than water, will as a result of the alternating fluid channel configuration in the electrodes 1, enter a respective one of the two first through-openings 11a and 11b, which are located vertically above the subunits 23. The hydrogen gas and the oxygen gas can thus individually be discharged/released from the electrolyser stack 35.

Hydrophobic Microporous PTFE material such as Zitex G may for example be used to stop water/electrolyte flowing out of the electrolyser with hydrogen and oxygen gas.

The invention claimed is:

1. Method of producing a gas mixture, said method comprising steps of:
    a) subjecting water to electrolysis to obtain a hydrogen gas stream and an oxygen gas stream;
    b) reacting the hydrogen gas stream with solid carbon to obtain a stream comprising hydrocarbon gas; and
    c) mixing the oxygen gas stream with the stream comprising hydrocarbon gas.

2. The method of claim 1, further comprising a step of subjecting water from a water source to a purification process to obtain purified water that is used in step a).

3. The method of claim 2, wherein the purification process comprises purification with activated carbon.

4. The method of claim 2, wherein the purification process comprises reverse osmosis.

5. The method of claim 2, wherein the purification process comprises deionization.

6. The method of claim 2, wherein the purification process comprises, in sequence, purification with activated carbon, reverse osmosis and deionization.

7. The method of claim 1, wherein the solid carbon of step b) comprises amorphous carbon.

8. The method of claim 1, wherein the solid carbon is provided as a coating on an inner surface of a reactor.

9. The method of claim 1, wherein the gas mixture obtained in step c) is combustible.

10. The method of claim 1, wherein the hydrocarbon gas is methane gas.

11. The method of claim 2, wherein the step of subjecting water from the water source to the purification process is performed after an electrolyte has been dissolved in the water.

* * * * *